(12) United States Patent
Cude

(10) Patent No.: US 7,828,541 B2
(45) Date of Patent: Nov. 9, 2010

(54) MOTOR DRIVEN MOLD

(75) Inventor: J. Michael Cude, College Grove, TN (US)

(73) Assignee: Coeur, Inc., Lebanon, TN (US)

( * ) Notice: Subject to any disclaimer, the term of this patent is extended or adjusted under 35 U.S.C. 154(b) by 515 days.

(21) Appl. No.: 11/752,047

(22) Filed: May 22, 2007

(65) Prior Publication Data

US 2008/0292738 A1 Nov. 27, 2008

(51) Int. Cl.
*B29C 45/36* (2006.01)
*B29C 45/80* (2006.01)

(52) U.S. Cl. .................. 425/149; 425/150; 425/171; 425/468

(58) Field of Classification Search .............. 425/150, 425/169, 170, 171, 438, 468, 149; 249/59, 249/64

See application file for complete search history.

(56) References Cited

U.S. PATENT DOCUMENTS

| | | | | |
|---|---|---|---|---|
| 2,994,936 A | * | 8/1961 | Rauch .................. | 425/468 |
| 3,712,786 A | * | 1/1973 | Aoki .................... | 425/438 |
| 4,205,950 A | * | 6/1980 | Suss et al. ............. | 425/126.1 |
| 4,342,549 A | * | 8/1982 | Lemelson ............. | 425/468 |
| 4,652,227 A | | 3/1987 | Aoki | |
| 4,828,769 A | | 5/1989 | Maus et al. | |
| 4,958,676 A | * | 9/1990 | Kuntz .................... | 425/438 |
| 5,234,337 A | | 8/1993 | Hehl | |
| 5,310,331 A | * | 5/1994 | Wakebe et al. ........ | 425/468 |
| 5,421,717 A | | 6/1995 | Hynds | |
| 5,472,331 A | * | 12/1995 | Watkins ................ | 425/149 |
| 5,492,658 A | | 2/1996 | Ohno et al. | |
| 5,798,074 A | | 8/1998 | McCready et al. | |
| 5,846,573 A | * | 12/1998 | Wurst et al. .......... | 425/149 |
| 6,663,376 B2 | * | 12/2003 | Tumlin et al. ........ | 425/577 |
| 2001/0045688 A1 | | 11/2001 | Royer | |
| 2005/0236725 A1 | * | 10/2005 | Niewels et al. ........ | 425/149 |
| 2008/0233227 A1 | | 9/2008 | Onishi et al. | |

FOREIGN PATENT DOCUMENTS

JP 2005-199449 A 7/2005
KR 2000-0007337 U 4/2000

OTHER PUBLICATIONS

Search Report and Written Opinion for corresponding PCT International Application No. PCT/US2008/063907, dated Oct. 29, 2008.

* cited by examiner

*Primary Examiner*—James Mackey
(74) *Attorney, Agent, or Firm*—Hahn Loeser & Parks, LLP; John J. Cunniff

(57) ABSTRACT

A mold includes a controller and core actuators that may independently drive a plurality of mold cores positioned with the mold. Sensors may be included whereby the mold cores are positioned in the mold core responsive to the sensor feedback. The core actuators may be servomotors and may further include motor controllers, one for each servomotor, for use in actuating the mold cores.

17 Claims, 6 Drawing Sheets

MOTOR DRIVEN MOLD

TECHNICAL FIELD

The present invention pertains to molds for thermoplastic molding, and more particularly, to molds having independently controlled cores used in plastic molding machines.

BACKGROUND OF THE INVENTION

It is well known to use thermoplastic molding technology to form plastic parts within a mold or die. One such process is called plastic injection molding (PIM). In this process, polymer material is melted and subsequently injected under pressure into a mold cavity through a runner system. Some materials require a heated runner system to prevent premature freezing of the material. Once injection into the mold, the plastic is allowed to cool and solidify thereby forming the article. The molded part is then ejected and inspected for ascetics and/or structural integrity.

In some molds, a core may be inserted into the mold cavity when forming the product. The plastic material packs into the mold cavity around the core. Accordingly, some cores are set prior to injecting the molten material and must be retracted before ejecting the solidified part. Other cores remain in the mold cavity but rotate to eject the product once the mold halves have been opened. One example may include an internally threaded closure cap. In this type of product, the core unscrews from the threads to eject the part from the mold.

Historically, actuation of injecting molding machines has been characterized by the use of mechanical devices, like spindles and fluid power utilizing devices like hydraulic cylinders and hydraulic motors. While hydraulic actuators are capable of transmitting sizeable forces effectively, most hydraulic fluid is considered unsanitary when used to mold certain types of products like those produced for the medical industry.

Some injection molding machines use electrically driven devices, for example electric motors, to actuate the clamping and injection units. While somewhat restricted to lower tonnage ranges, all-electric injection molding machines have been proven effective for their intended purpose. Electric motors, interconnected to the molds, are also used to actuate moveable cores. Linearly moveable cores are usually set and pulled by a combination of components including an electric motor and a ballscrew, for example, which translates rotary motion into linear motion. However, molding machines that utilize electric motors typically drive all of the cores simultaneously and are not directly integrated with the molds. One electromotive device is interconnected to actuate all of the cores.

State of the art technology does not provide for individual control of the various cores. Furthermore, adjusting mold cores due to wear can be cumbersome and require valuable machine downtime and labor. What is needed is a system for individually actuating mold cores for independent movement during the molding cycle and for quickly and automatically adjusting mold core movement without costly down time. The embodiments of the present invention obviate the aforementioned problems.

BRIEF SUMMARY

In one embodiment of the present invention a mold includes one or more mold sections, which may be mold halves, having recesses that define at least one cavity for use in forming a moldable article. The mold may also include at least first and second mold cores extending entirely or partially into the cavity and/or cavities, wherein the at least first and second mold cores are selectively moveable. A prime mover is connected to independently drive the mold cores.

In one aspect of the embodiments of the present invention, the prime mover may include a first and at least a second rotary actuator where the first and at least a second rotary actuators are connected to first and at least a second mold core respectively.

Yet another aspect of the embodiments of the present invention includes a controller that is programmable to independently change the set position of the first mold core with respect to the at least a second mold core.

In still yet another aspect of the embodiments of the present invention, the set positions of the first and at least a second mold core are selectively programmable between minimum and maximum positions respectively.

In another embodiment a mold for forming moldable articles includes one or more mold sections having at least a first cavity for forming an associated moldable article, which may be a plastic article. The mold core may be operatively received in the one or more mold sections and selectively moveable within the cavity. An actuator, which may be a rotary actuator, may be connected to drive the mold core. A controller may be incorporated to activate the actuator. Sensors may also be included to sense movement of the mold core. The sensors may include sensor output that is communicated back to the controller for use in controlling the drive unit and mold core responsive to the sensor output.

One aspect of the embodiments of the present invention includes a mold core that is selectively moveable within the cavity between minimum and maximum positions, and wherein the controller is operable to selectively adjust the position of the mold core between the minimum and maximum positions and wherein sensors may be utilized to set the mold core position.

Yet another aspect of the embodiments of the present invention includes a controller that is programmable to change the minimum and maximum positions of the mold core. By programming the controller to change the minimum and maximum position, the operator does not have to mechanically adjust the components of the mold.

Still another aspect of the embodiments of the present invention includes an actuator or prime mover which may be an electromotive device, like a motor. Types of motors may include AC or DC motors, constant or variable speed motors, or any motor type chosen with sound engineering judgment. Examples of such motors may include servomotors or stepper motors, Even another aspect of the embodiments of the present invention includes a sensor that is a current sensor operatively connected to the servo motor. In particular, the current sensor may be integrated into and/or an integral part of the servo motor.

Another aspect of the embodiments of the present invention includes a force transducer sensor connected to detect the force applied to the mold core. Feedback from the force transducer may be fed back to the controller and used to determine when the mold core has reached the appropriate position with the mold cavity.

DETAILED DESCRIPTION OF THE INVENTION

Figure 1:
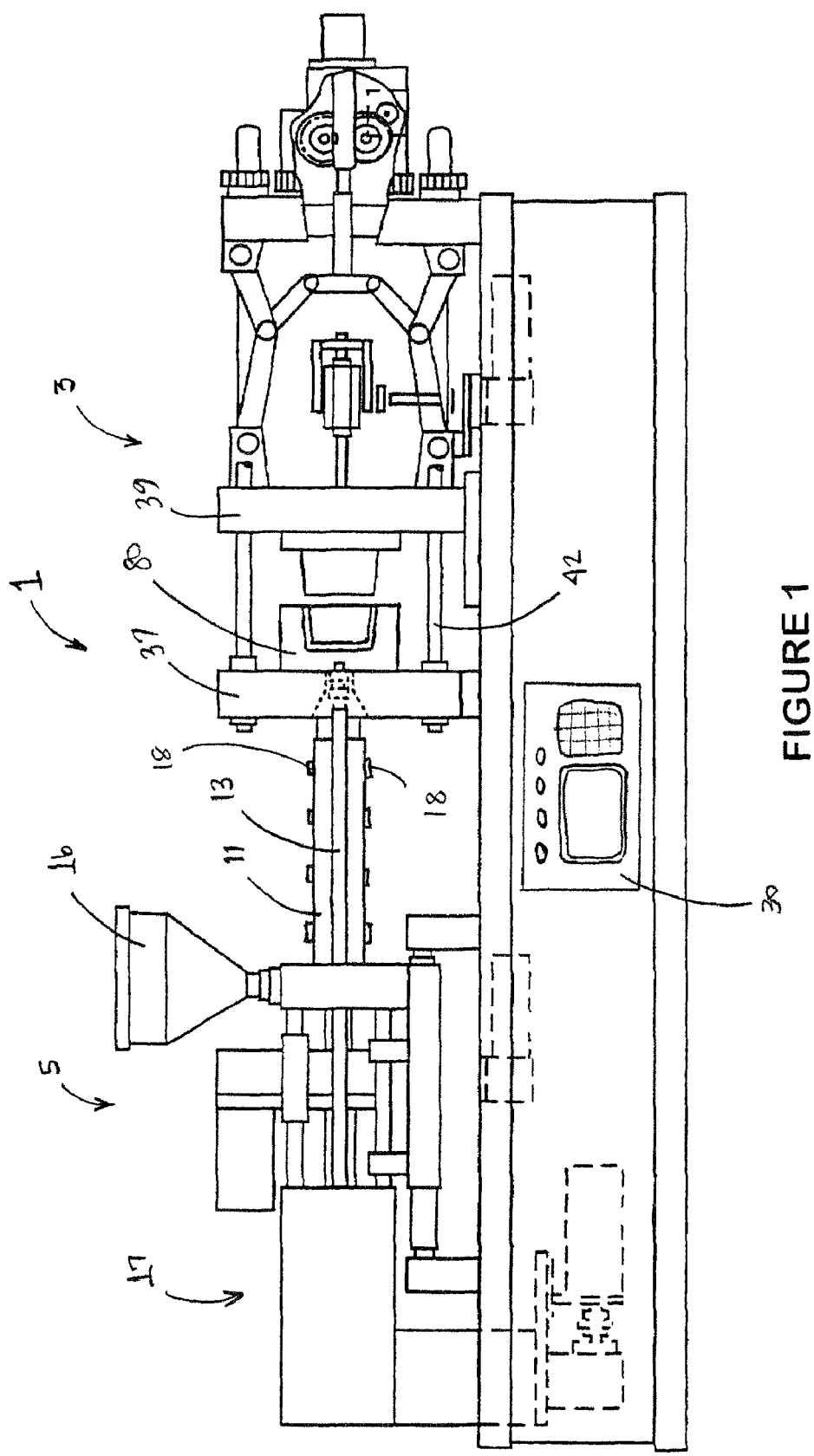
FIG. 1 is a side view of a plastic molding machine according to the embodiments of the present invention.

Referring now to the drawings wherein the showings are for purposes of illustrating embodiments of the invention only and not for purposes of limiting the same, FIG. 1 shows a plastic molding machine depicted generally at 1. In an exemplary manner, the plastic molding machine will be described in the context of a plastic injection molding machine 1. However, application to other types of molding machines, plastic or otherwise, will be readily seen by persons of ordinary skill in the art. In general, the injection molding machine 1 may include a clamping unit 3 and an injection unit 5 arranged horizontally. The injection unit 5 may comprise a barrel 11 having a resin-feeding screw 13 or extrusion screw 13 rotatably positioned inside the barrel 11. A hopper 16 is attached to a barrel inlet for feeding solid resin into the barrel 11 at a first end thereof. A screw motor 17, which may be a hydraulic motor or an electric servomotor, may be connected to drive the screw 13. Accordingly, as the screw 13 rotates, screw flights, not shown, auger the resin through the barrel 11. The screw flights are constructed to increasingly narrow the region between the inner diameter of the barrel 11 and the surface of the screw 13 thereby shearing and consequently melting the resin in preparation for injection into a mold or die as will be discussed further below. To assist in melting the resin, heater bands 18 may be wrapped around the barrel 11 in controlled heated zones. A controller and feedback sensors may be incorporated to individually control the heated zones. In fact, the controller may be programmable for setting a heating profile along the length of the barrel 11. Overall operation of the injection unit 5 may be controlled or coordinated by a machine controller 30. In one embodiment, the machine controller 30 or controller 30 may be selectively programmed to adjust various functions of the injection unit 5 including but not limited to: the heated zones on the barrel, recovery time, injection speed and pressure, back pressure and the like. In that the control of an injection unit 5 is well known in the art, no further explanation will be offered at this time.

Figure 2:
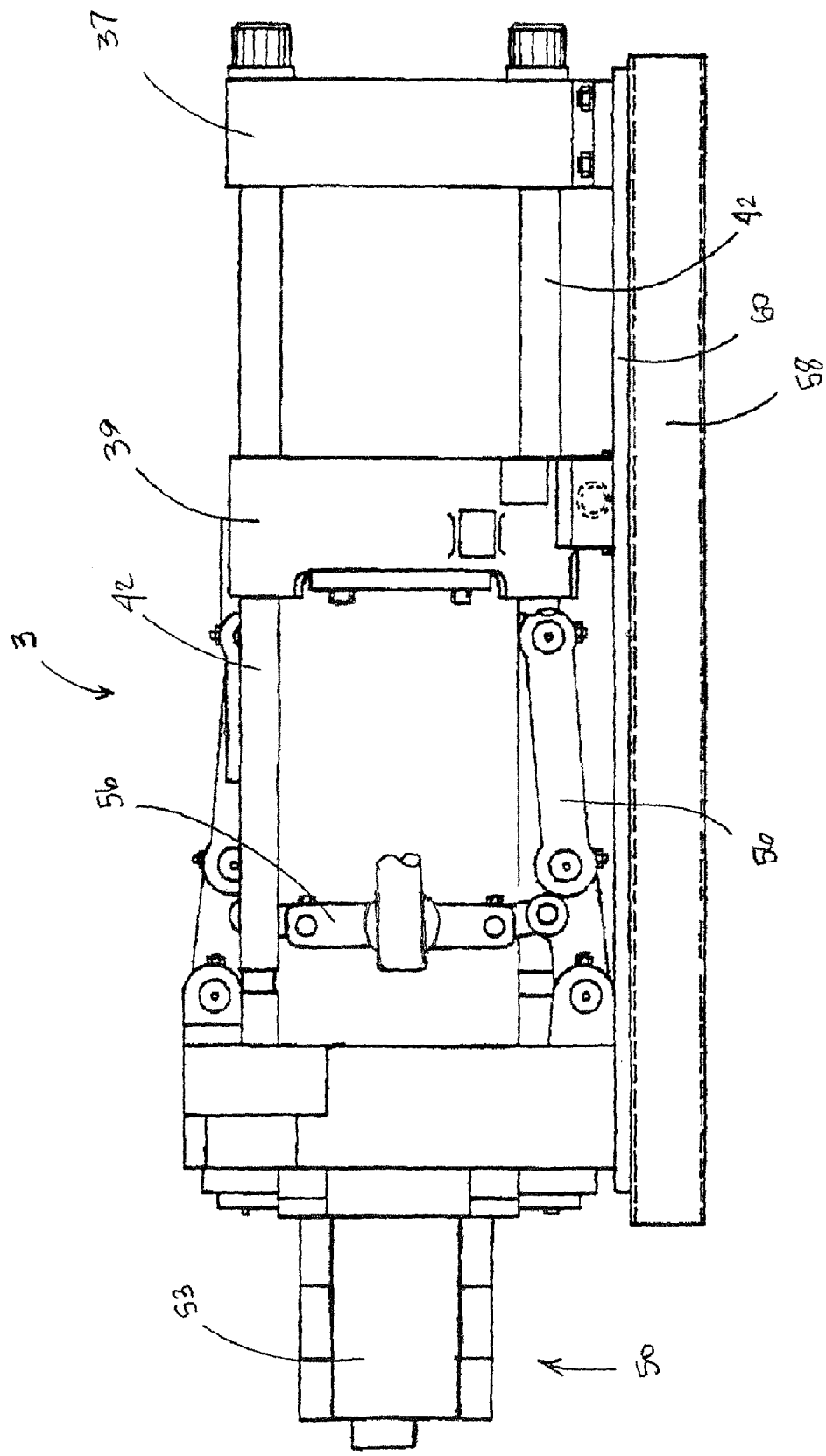
FIG. 2 is a side view of a clamping unit of a plastic molding machine according to the embodiments of the present invention.

With reference to FIGS. 1 and 2, the clamping unit 3 of the injection molding machine 1 may be designed to receive a mold 80 for molding plastic articles. The clamping unit 3 may be comprised of a stationary platen 37 and a movable platen 39. Tie bars 42 align the platens 37 and 39 such that movement of the moveable platen 39 is substantially collinear with the stationary platen 37. It is noted that other platen configurations may be utilized without departing from the intended scope of coverage of the embodiments of the present invention. The moveable platen 39 may be actuated by a prime mover depicted generally at 50. In one embodiment, the prime mover 50 may be an electrically driven prime mover incorporating an electric motor 53. Hydraulic actuators also possess sufficient locomotive force to function as a prime mover 50. An interconnected series of linkages 56 may be positioned between the prime mover 50 and the moveable platen 39 thus facilitating movement back and forth along a base 58. Lubricated skids 60 may be used to assist in friction-reduced movement of the movable platen 39 in the aforementioned manner. The series of linkages 56, referred to as a toggle clamping unit 56', may maneuver the movable platen 39 into position and lock over applying a resistive force to maintain intimate contact between one or more mold sections as will be discussed further in a subsequent paragraph. Accordingly, the mold 80 may be installed into the plastic injection molding machine 1 and more specifically into the clamping unit 3 for molding plastic articles. Once installed, the clamping unit 3 may cycle between open and closed positions facilitating the ejection of the plastic article. It is noted that while the present embodiment of the clamping unit 3 is described as a toggle-type clamping unit, other types of clamping units may be utilized without departing from the intended scope of coverage including but not limited to hydraulic clamping units. However, certain product lines and work environments may benefit from the use of non-hydraulic actuators, such as electric motors. When closed, the clamping unit 3 functions to hold the mold 80 together, providing a counter force that resists the force from the pressure of injecting the molten material. In this manner, the platens 37 and 39, the tie bars 42, and the prime mover 50 and/or associated linkage 56 define a clamping system for applying a clamping force to the mold sections.

Figure 3:
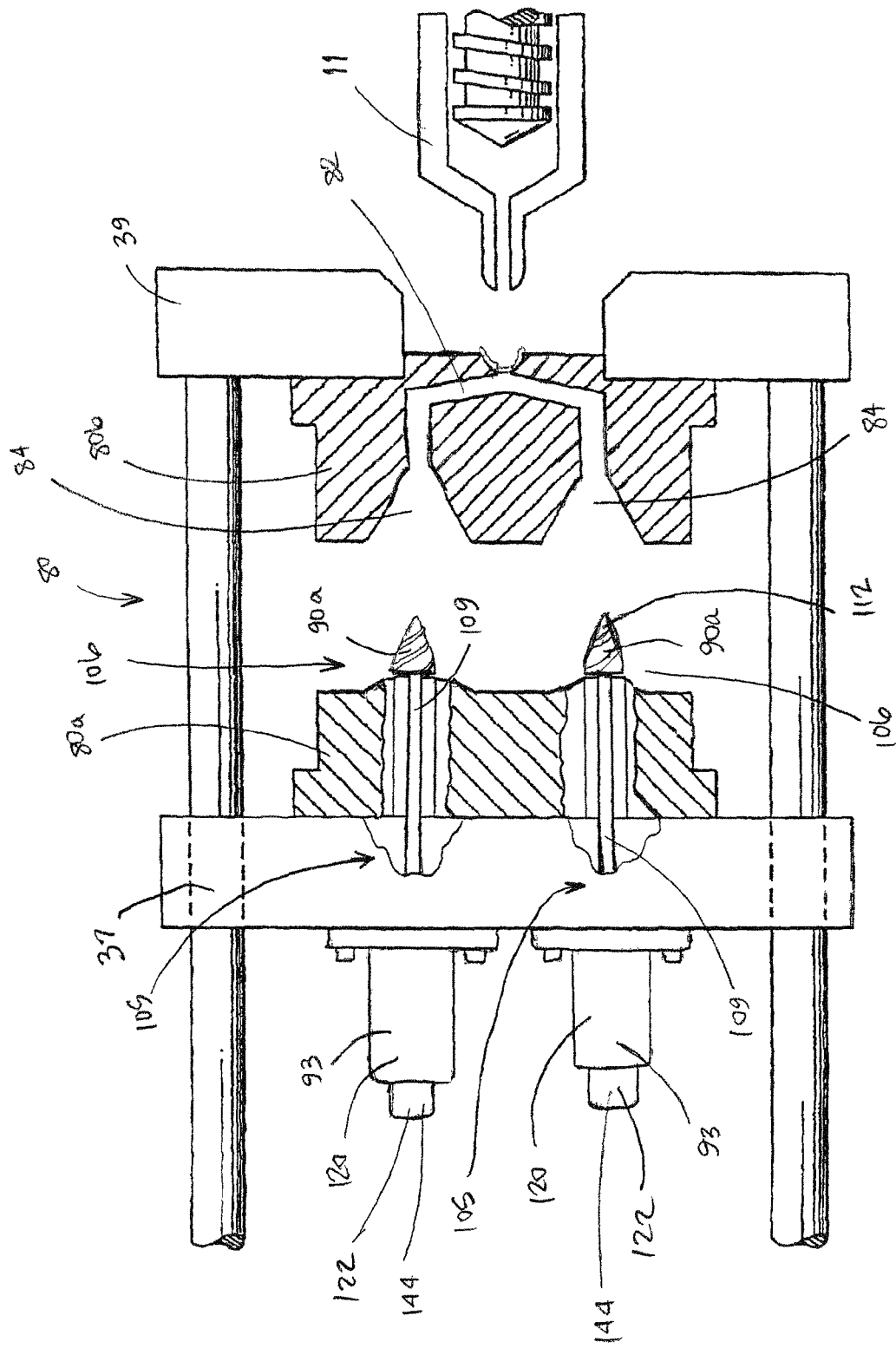
FIG. 3 is a partial cutaway side view of a mold installed in the clamping unit of a plastic molding machine according to the embodiments of the present invention.

With continued reference to FIGS. 1 and 2 and now to FIG. 3, as previously mentioned, the mold 80 or die 80 may be installed between the stationary 37 and moveable 39 platens of the injection molding machine 1. In one embodiment, the mold 80 may include multiple mold portions or sections 80a and 80b. Each mold section 80a, 80b may have a recess fashioned therein defining a cavity 84 or cavities 84 configured for forming a particular product. Accordingly, the cavities 84 function to receive melted resin when the mold sections 80a, 80b are closed together. A runner system 82 channels molten material from the injection unit barrel 11 into the cavity 84 or cavities 84 of the mold sections 80a and 80b. Once filled, the mold sections 80a and 80b are held in place for an amount of time sufficient to allow the plastic article to cool and solidify. It is noted that any shape, configuration and/or quantity of cavities 84 may be included in the mold 80 as chosen with sound engineering judgment. Accordingly one of the mold sections 80a or 80b may be mounted onto the stationary platen 37 and the other mold section 80b or 80a may be mounted onto the moveable movable platen 39. In operation, the movable platen 39 is moved towards the stationary platen 37 until the mold sections 80a and 80b contact. Typically, the moveable platen 39 travels at a relatively fast speed when the mold sections 80a and 80b are far apart and at a slower speed as the mold section 80a and 80b approach each other. It is restated here that the molded article is formed by juxtaposing the mold sections 80a and 80b and their respective cavities 84 together. In this manner, a closed mold 80 defines the whole cavity 84, or cavities 84, for producing a plastic article. Once the mold section 80a and 80b are closed together, the toggle linkage 56 maintains sufficient clamping force on the mold sections 80a and 80b to resist the inflow of pressurized molten plastic as previously mentioned. Molding machines of this type are usually referred to by their clamping force in tons. Machines may range from 20 tons, or smaller, up to 2000 tons. However, even larger tonnage machines have been manufactured for production use. It is to be construed that the novel aspects of the embodiments of the present invention are applicable to any tonnage machine.

Figure 4:
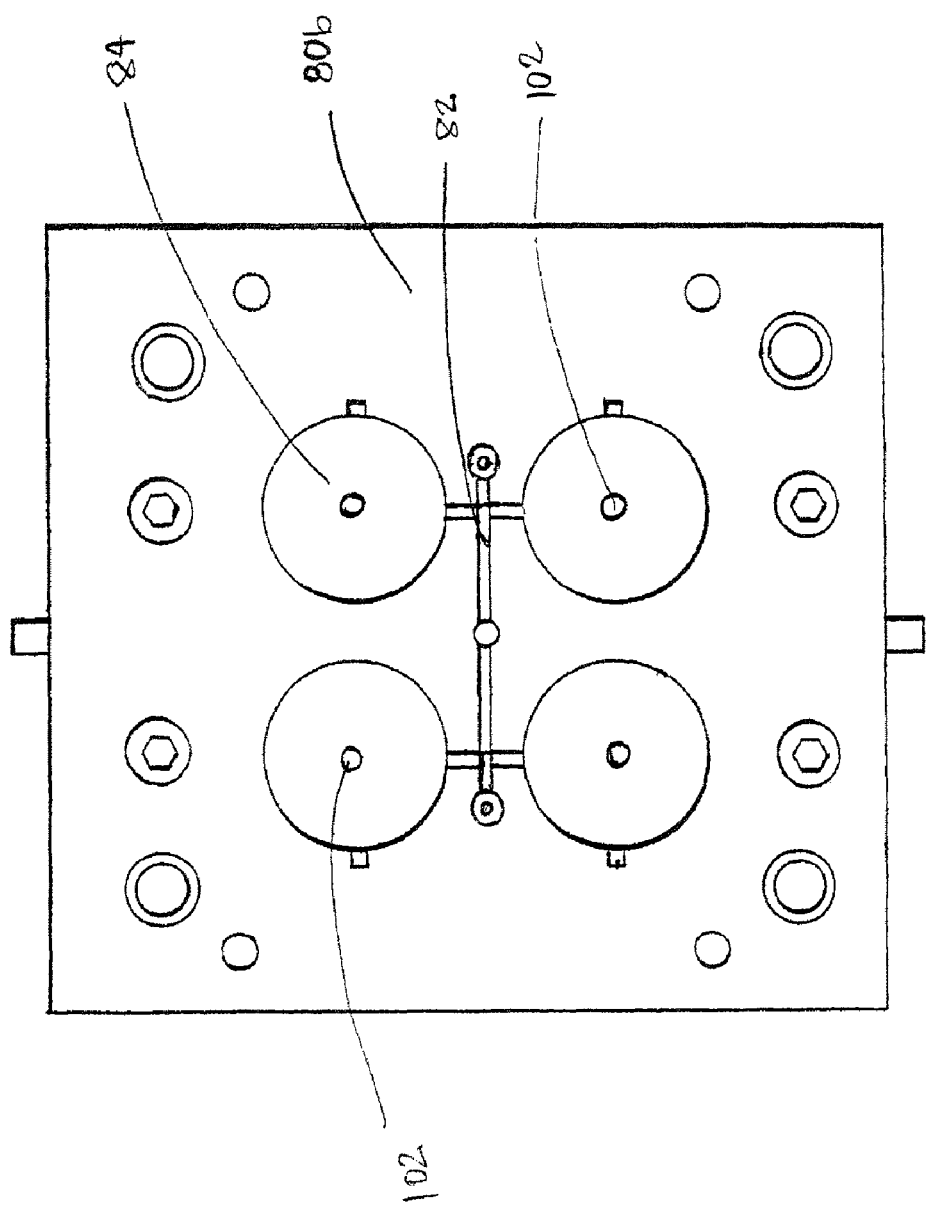
FIG. 4 is an end view showing a multi-cavity mold having moveable inserts according to the embodiments of the present invention.
Figure 5:
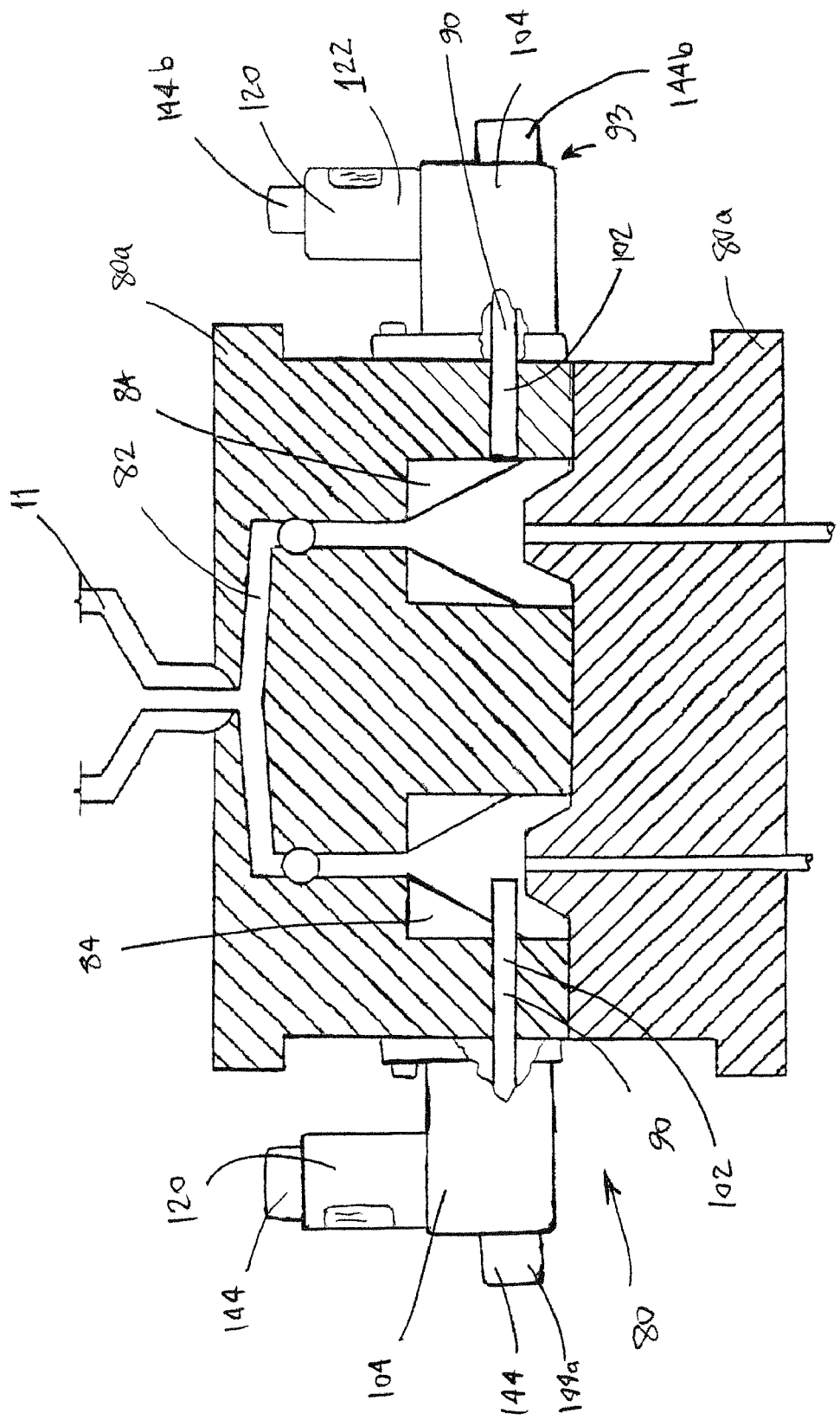
FIG. 5 is a partial cutaway side view of a mold showing mold cores and core actuators according to the embodiments of the present invention.

With reference to FIGS. 3 through 5, once the mold sections 80a and 80b are closed or clamped together the injection unit 5, having recovered to fill the barrel with melted plastic, may inject and pack the molten material into the cavities 84 thereby forming the desired article. In one embodiment, the molded articles may incorporate a core 90 or an insert 90 around which the molten material may flow. The core 90 may selectively be set, i.e. inserted into the mold cavities, prior to injecting the resin, and pulled, i.e. withdrawn from the mold cavity, after the plastic article has solidified. It will be readily seen that the core 90 affects the shape of the molded article as the molten material is packed in the cavities 84. In one embodiment, a core 90 may be inserted into the mold 80 in a linear motion by a core actuator 93. It follows that linear actuators 104 may be incorporated into the mold 80 to set and pull the core 90. Certain plastic articles may utilize a core 90 having a more complex configuration, making it impossible to withdraw the core 90 in a linear manner without damaging the molded part. One example of this type of plastic article is a closure cap having internally formed threads. Withdrawing the core 90 in a linear manner would strip the threads rendering the plastic article useless for its intended purpose. In this embodiment, the core 90 may be a rotating core 90a that when actuated unscrews from contact with the molded article. It is to be construed that the rotating core 90a may be used with any molded articles having threads or even other molded articles not having screw threads. For multi-cavity molds, the mold 80 may incorporate a plurality of cores 90, 90a. One core 90, 90a may reside in each cavity 84 within the mold. For example, a four cavity mold may include four cores. Alternatively, a single cavity 84 may include multiple cores 90, 90a. In each case, the cores 90, 90a may be actuated by its own core actuator 93 as will be discussed in detail below.

With continued reference to FIG. 5, a linearly actuated core 90 may comprise a pin 102 fashioned to slide within an aperture formed in one of the mold sections 80a, 80b. The pin 102 may therefore be set or pulled at the appropriate time in the molding cycle. A linear drive mechanism 104 may be utilized to move the pin 102 in and out. Fashioning both the pin 102 and the aperture in the mold sections 80a, 80b with close tolerances may be necessary for molding an acceptable part. The linear drive mechanism 104' may comprise a shaft having screw threads, such as a ballscrew, or a slide having rails, neither shown. In fact any type of linear drive mechanism may be chosen with sound engineering judgment to move the pin 102. In one embodiment, the linear drive mechanism 104 may be disposed between a rotary actuator 120 and the core pin 102. In this embodiment, the linear drive mechanism 104 may function to convert the rotary output of a rotary actuator 120 into linear motion. Still, any mechanism for actuating the core 90 and any type of motive drive may be used as chosen with sound engineering judgment.

With reference again to FIG. 3, a rotary actuated core 90a may comprise a core shaft 109 received within an aperture of the mold section 80a and/or 80b. One end 105 of the core shaft 109 may be coupled to a rotary actuator 120, which may be a motor. More specifically the motor may be a stepper motor or a servomotor 122. The distal end 106 of the core shaft 109 may extend into the cavity 84 of the mold sections 80a, 80b. A threaded core end 112 may be fashioned or affixed to the distal end 106 of the core shaft 109. The core end 112 may have any configuration necessary for forming a molded article as will be understood by persons of ordinary skill in the art. Bearings, not shown, or other friction reducing devices may be incorporated into the mold to facilitate continuous rotational use of the core 90a. In one embodiment, the cores 90a may be directly coupled to the output of the core actuator 93 or servomotor 122 whereby the molded article is thereby ejected by unscrewing from the plastic part.

Figure 6:
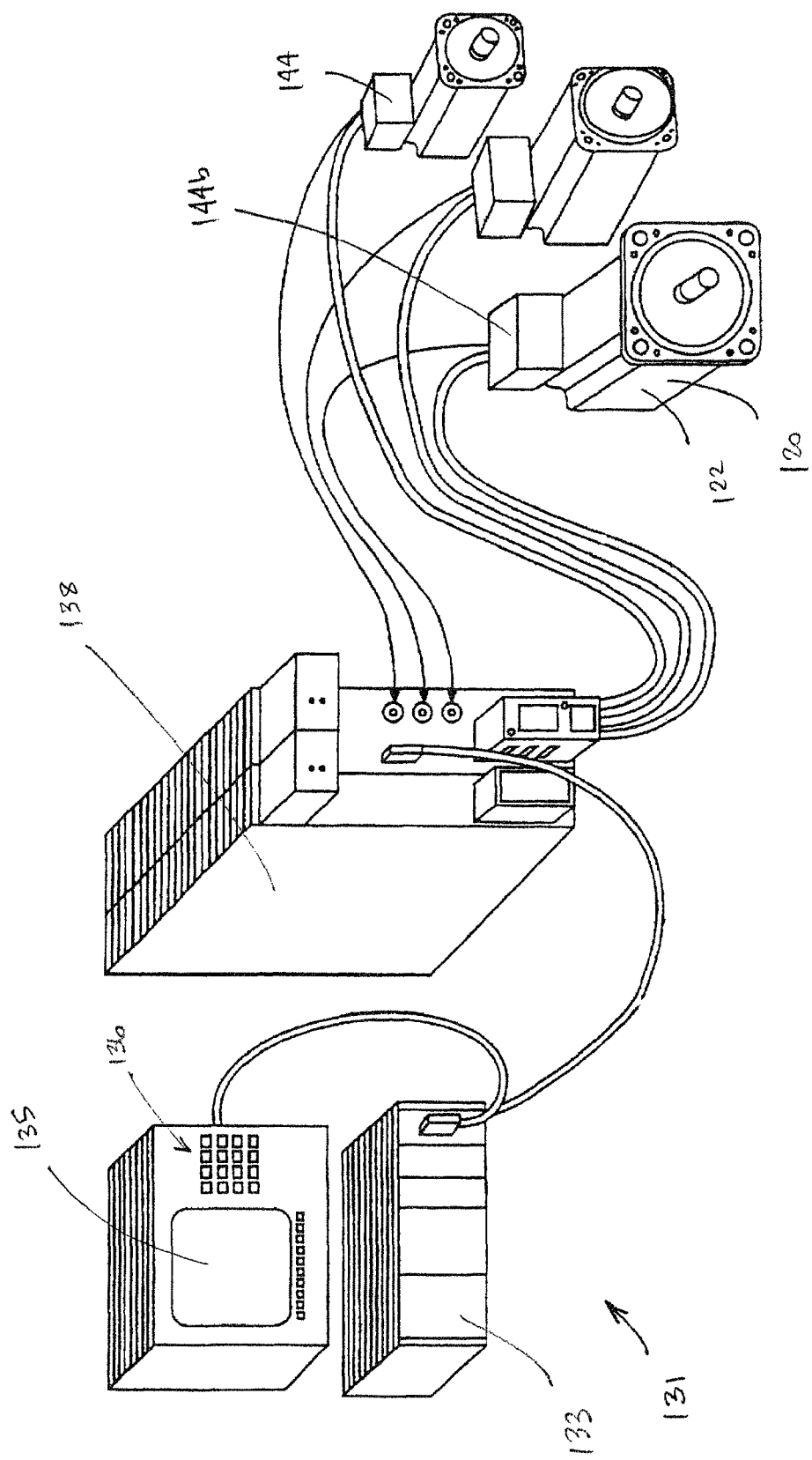
FIG. 6 is a schematic representation of a set of servomotors and corresponding motor controller according to the embodiments of the present invention.

With continued reference to FIGS. 3 through 5 and now to FIG. 6, each core 90, 90a, and corresponding core shaft 109 or pin 102, included within the mold 80 may respectively be connected to individual core actuators 93, which may be servomotors 122 as previously mentioned. It is noted that the rotary actuators 120 of this embodiment may be non-hydraulic rotary actuators as exemplified by the use of servomotors 122. Still, any type of rotary actuator 120 may be chosen with sound judgment. A controller 131 may be connected to manage operation, i.e. activation and deactivation, of the rotary actuators 120. The controller 131 may include a logic processor incorporated into a controller housing 133 and may further include input and output devices such as display screens 135, keyboard or keypads 136 or any other I/O (Input/Output) devices used to communicate with the controller 131. The logic processor may also be programmable. For example, the logic processor may be a microprocessor that functions to execute an algorithm programmed in a high level programming language. Alternatively, the logic processor may function to process low level logic commands to affect operation of the controller 131. It is to be construed that any manner programming the controller 131 may be chosen as is appropriate for use with the embodiments of the present invention. In this manner, operation of the controller 131 may be automatic, which is to say that the controller 131 may cycle through the molding process without direct user interaction. Accordingly, the controller 131 may receive feedback data from a sensor 144 and make adjustments to the output of the rotary actuator 120 based on the sensor data. It is noted here that electronic circuitry may be used interchangeably in place of or in conjunction with the logic processor and algorithm. The controller 131 may also comprise a motor controller 138 for activating the rotary actuator 120. In one embodiment, the motor controller 138 may incorporate a variable frequency drive for use in driving the rotary actuators 120 at different speeds. In utilizing a plurality of rotary actuators 120, the controller 131 may include a plurality of motor controllers 138, and more specifically a plurality of variable frequency drive units, in a one to one corresponding relationship with the rotary actuators 120. This effectively allows each rotary actuator 120 to be driven independently from the others. It is noted that the plurality of variable frequency drive units 138 may be incorporated into a single housing, as shown in FIG. 6, or may be separately housed.

As previously mentioned, the controller 131 may receive feedback signals from one or more sensors 144 incorporated to read to the position of or other operating characteristics of the cores 90, 90a, including but not limited to velocity and/or acceleration, resistance, amperage and the like. The sensors 144 may include linear positioning sensors 144a such as for example linear-variable-differential-transformers (LVDT). Other sensors 144 may detect the position and speed of a rotating shaft like an encoder or resolver 144b. However, any type, quantity and/or location of sensors 144 may be utilized in the embodiments of the present invention. The feedback data derived from the sensors 144 may be communicated to and processed by the controller 131 to drive the rotary actuators 120 accordingly. Specifically, the feedback data may be used by the logic processor of the controller 131 for adjusting the "set" position of the core 90. In order to mold an acceptable plastic part, the core 90 may need to be accurately inserted a precise distance in the mold cavity 84. The controller 131 may activate the rotary actuator thereby moving the core 90 inwardly until the predetermined position has been reached. It is noted here that as the controller 131 may be programmable to alter the "set" position of the core 90 as will be discussed further in a subsequent paragraph. In one embodiment, the core 90 may be driven inwardly until the core 90 contacts a surface of the mold cavity 84. Sensor data may be used to detect contact of the core 90 signaling the "set" position to the controller. In this embodiment, current sensors may be used to detect the electrical current drawn by the servomotors 122. As the current increases to a threshold level, the controller 131 may then deactivate the rotary actuator thereby setting the core 90 in preparation for the molding cycle. In this manner, the controller 131 is capable of automatically compensating for the position of the core 90 as the core pins wears. That is to say that as the core 90 wears down, the controller 131 is constructed and/or programmed to engage the core 90 until it contacts the predetermined position against the cavity wall thus compensating for wear in the core pin.

In another embodiment, controller 131 may be programmed to insert the core 90 a specific distance into the mold cavity 84. The distance may be programmably set by a user or programmer between maximum and minimum positions. The maximum position may be a fully extended position where the core 90 contacts the surface of the cavity wall as described in the previous embodiment. The minimum position may be the fully retracted position where the core 90 is completely outside of the cavity 84 entirely. The core 90 may also be deactivated in one mold cavity 84 and activated in another mold cavity. In this instance, the maximum position of the first core 90 may be set to the minimum position effectively deactivating that particular core 90. However, the cores 90 may be set to any position between the maximum and minimum positions. An administrator of the controller and/or controller program may adjust the maximum and minimum positions. Administrator may include any person authorized to adjust the maximum and minimum position. Authorization may be facilitated by implementing a password and/or pass code for gaining access to the controller program. Accordingly, the password and/or pass code may be distributed to a select group of users or programmers of the controller 131. Additionally, various levels of authorized access may be resident with the controller 131 to prevent or allow groups of persons to make changes to the core "set" positions. Mechanical lockouts restricting access may also be implemented including, but not limited to, key locks. However, any means for restricting access to the controller 131 may be chosen as is appropriate for use with the embodiments of the present invention.

With continued reference to FIGS. 3 through 6, each of the cores 90, 90a may be driven by its own corresponding rotary actuator 120. Accordingly, the controller 131 may include a plurality of motor controllers 138 for activating the rotary actuators 120. In one embodiment, one motor controller 138 may be included for every core 90 or 90a residing within the mold 80. However it is contemplated in an alternate embodiment, that more than one core 90 or 90a may be controlled by a single motor controller 138. For example, two cores 90, 90a may be controlled by a single motor controller 138 and may be resident within the same cavity 84 or may be positioned within different cavities 84. The controller 131 may be configured to independently activate each of the rotary actuators 120. In this way, each individual core 90, 90a may be driven independently from the other cores 90, 90a. Additionally, each core 90, 90a may be accompanied by separate sensors 144 for use by the controller 131 in "setting" or activating the cores 90 or 90a respectively. It is noted that while some rotary actuators 120, like servomotors 122 for example, include sensors with the electric motor, each core 90, 90a may include additional sensors for use in a manner consistent with the embodiments described herein. The sensors 144 may be used to determine when the core actuator has reached the precise distance that the core 90 is to be "set." In this manner, each core 90, 90a, with respect to the other cores 90, 90a, may be individually or independently driven by the controller 131 in response to the sensor feedback data associated with that particular core 90, 90a.

During a molding cycle of the injection molding machine 1, a signal from the machine controller 30 may be sent to the controller 131 to activate the cores 90, 90a. Accordingly, the cores 90, 90a may be operated by to the controller 131 and any programmed mode of operation as setup by the administrator. It follows that one core 90, 90a may be turned off completely while the others remain active. Separately, one core 90, 90a may be adjusted or programmed to "set" at a different position than a different core 90, 90a. Even another core 90, 90a may be compensated or automatically adjusted to a different position with respect to another core 90, 90a in response to the sensor feedback data from that particular core 90, 90a. However, it is to be construed that any configuration, sequence and/or set point of the cores 90, 90a may be chosen with sound judgment as is appropriate for use with the embodiment of the present invention.

The invention has been described herein with reference to the preferred embodiment. Obviously, modifications and alterations will occur to others upon a reading and understanding of this specification. It is intended to include all such modifications and alternations in so far as they come within the scope of the appended claims or the equivalence thereof.

What is claimed is:

1. A system for use in a plastic molding machine, comprising:
    one or more mold sections wherein at least one of the one or more mold sections includes multiple recesses defining a first and at least a second cavity for forming associated moldable articles;
    a first and at least a second mold core received within the first and at least a second cavity respectively, the first and at least a second mold core being selectively moveable within the mold cavities;
    a prime mover operatively connected to the first and at least a second mold core, wherein the prime mover comprises a first and at least a second rotary actuator, wherein the first and at least a second rotary actuator are connected to the first and at least a second mold core respectively;
    a controller operatively communicated to activate the prime mover, wherein the controller is operable to independently drive the first and at least a second mold core; and,
    a sensor operatively connected to sense movement of the first or at least a second mold core, the sensor having sensor output communicated to the controller, wherein the sensor includes a force transducer connected to detect force applied to the mold core.

2. The system as defined in claim 1, wherein the first and at least a second rotary actuator includes a first and at least a second servo motor.

3. The system as defined in claim 2, further comprising:
    at least a first variable frequency drive unit for controlling operation of the first and at least a second servo motor.

4. The system as defined in claim 1, further comprising:
    at least a first motor controller electrically connected between the prime mover and the controller.

5. The system as defined in claim 1, wherein the first and at least a second mold core are selectively rotatable.

6. The system as defined in claim 1, wherein the controller is programmable to independently change a set position of the first mold core with respect to the at least a second mold core.

7. The system as defined in claim 6, wherein set positions of the first and at least a second mold core are selectively programmable between minimum and maximum positions respectively.

8. The system as defined in claim 7, wherein the controller is adapted such that access to the controller for changing the set positions of the first and at least a second mold core is restricted by an electronic code or by a mechanical lock.

9. A mold for forming associated moldable articles, comprising:
- one or more mold sections having at least a first recess defining a cavity for forming an associated moldable article;
- a mold core operatively connected to the one or more mold sections, the mold core being selectively moveable within the cavity;
- a prime mover operatively connected to the mold core, wherein the prime mover is a servomotor;
- a controller operatively in communication with, and adapted to actuate the prime mover; and,
- a sensor operatively connected to sense movement of the mold core, the sensor having sensor output communicated to the controller, wherein the sensor includes a force transducer connected to detect force applied to the mold core.

10. The mold as defined in claim 9, wherein the controller is operable to automatically adjust the position of the mold core responsive to the sensor output.

11. The mold as defined in claim 10, wherein the mold core is selectively moveable within the cavity between minimum and maximum positions; and,
wherein the controller is programmable to change the minimum and maximum positions of the mold core.

12. The mold as defined in claim 9, wherein the prime mover is connected to the one or more mold sections.

13. The mold as defined in claim 9, further comprising:
- a linear drive mechanism connected between the servomotor and the mold core.

14. The mold as defined in claim 13, wherein the sensor is a current sensor operatively connected to the servomotor.

15. The mold as defined in claim 9, wherein the one or more mold sections include a plurality of cavities; and further comprising:
- at least one mold core for each of the plurality of cavities; and,
- wherein the controller is operable to independently drive each of the mold cores.

16. A drive system for an associated mold, the mold having a recess defining at least a first cavity for forming one or more associated moldable articles, the mold having one or more cores selectively moveable within the at least a first cavity, the drive system comprising:
- one or more servomotors operatively connected to the associated one or more cores respectively;
- one or more sensors operatively connected to the one or more servomotors wherein each sensor includes a force transducer connected to detect force applied to a corresponding core of the one or more cores;
- a controller for activating the one or more servomotors;
- at least a first variable frequency motor controller electrically connected between the one or more servomotors and the controller; and,
- wherein the controller is operable to drive the associated one or more cores responsive to output from the one or more sensors, and wherein when the mold contains more than one core, the controller is operable to independently drive the cores responsive to output from the plurality of sensors.

17. A system for use in a plastic molding machine, comprising:
- one or more mold sections wherein at least one of the one or more mold sections includes multiple recesses defining a first and at least a second cavity for forming associated moldable articles;
- a first and at least a second mold core received within the first and at least a second cavity respectively, the first and at least a second mold core being selectively moveable within the mold cavities, wherein the first and at least a second mold core are selectively rotatable;
- a prime mover operatively connected to the first and at least a second mold core;
- a controller operatively communicated to activate the prime mover, wherein the controller is operable to independently drive the first and at least a second mold core; and,
- a sensor operatively connected to sense movement of the first or at least a second mold core, the sensor having sensor output communicated to the controller, wherein the sensor includes a force transducer connected to detect force applied to the mold core.

\* \* \* \* \*